May 23, 1967  E. D. SIGL  3,321,134
GEAR TRAIN RESETTING MECHANISM
Original Filed Sept. 18, 1963  5 Sheets-Sheet 1
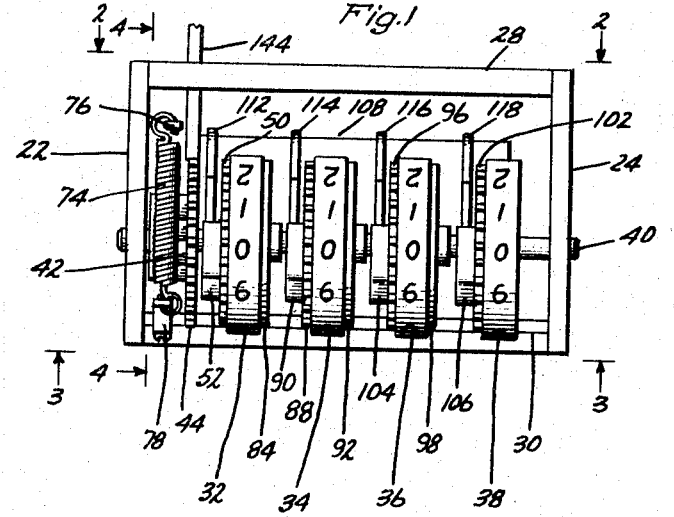
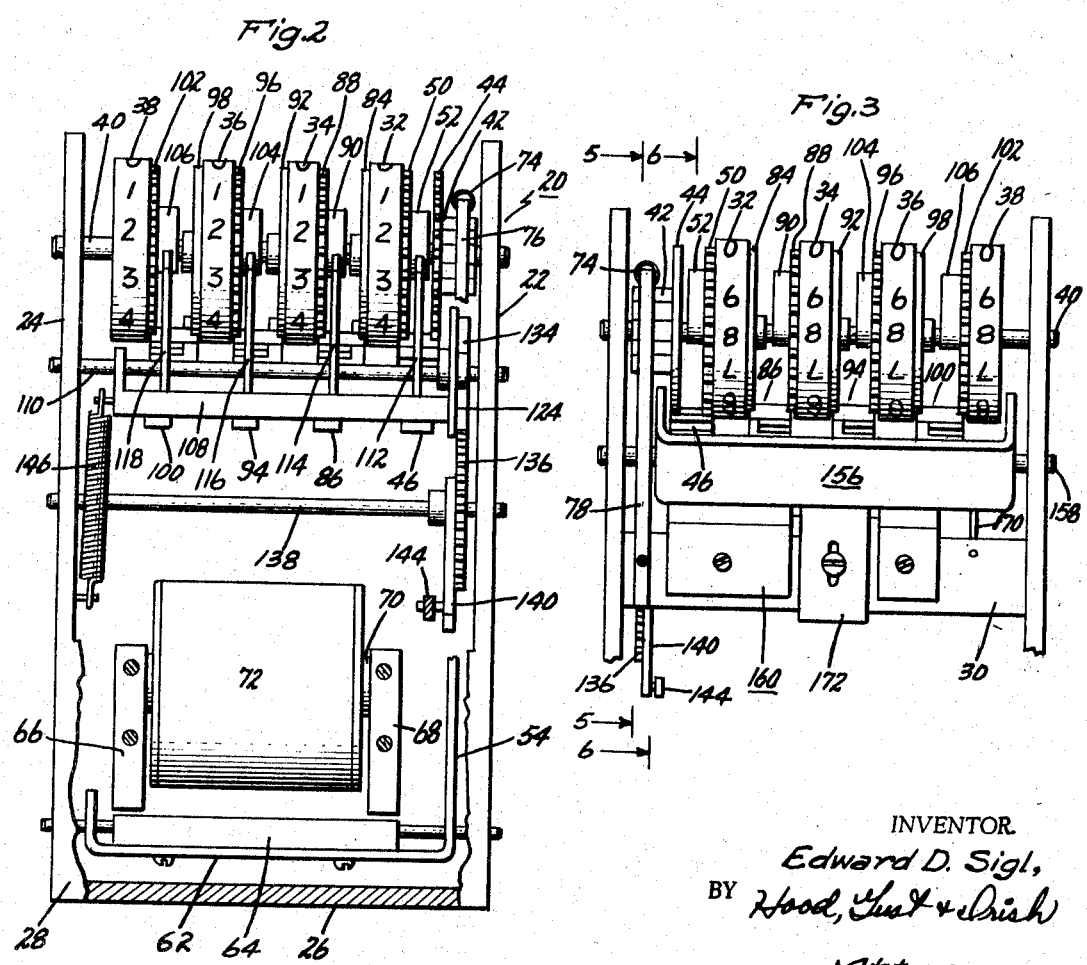
INVENTOR.
Edward D. Sigl,
BY Hood, Gust & Irish
Attorneys.

INVENTOR.
Edward D. Sigl,
BY Hood, Gust & Irish
Attorneys.

INVENTOR.
Edward D. Sigl,
BY
Attorneys.

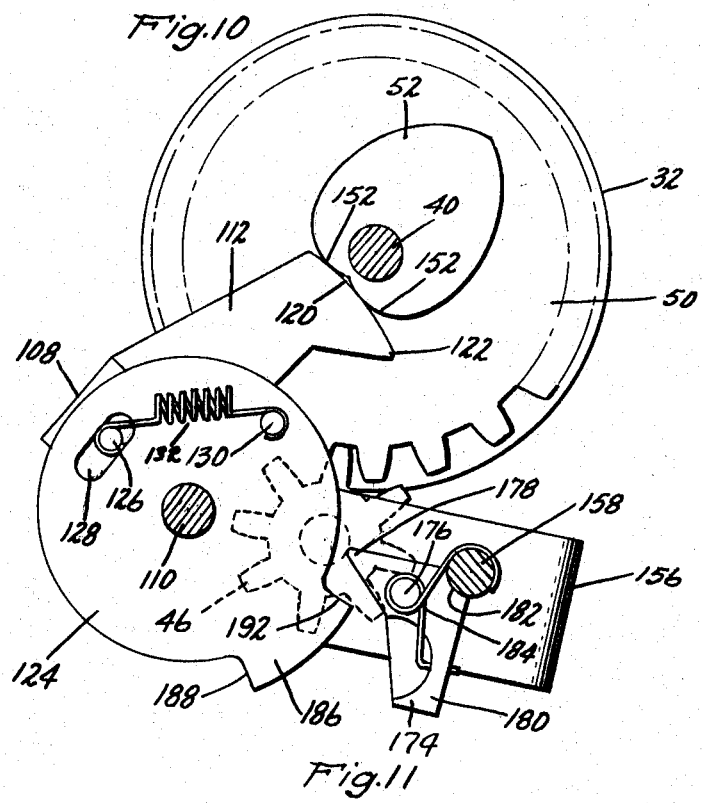
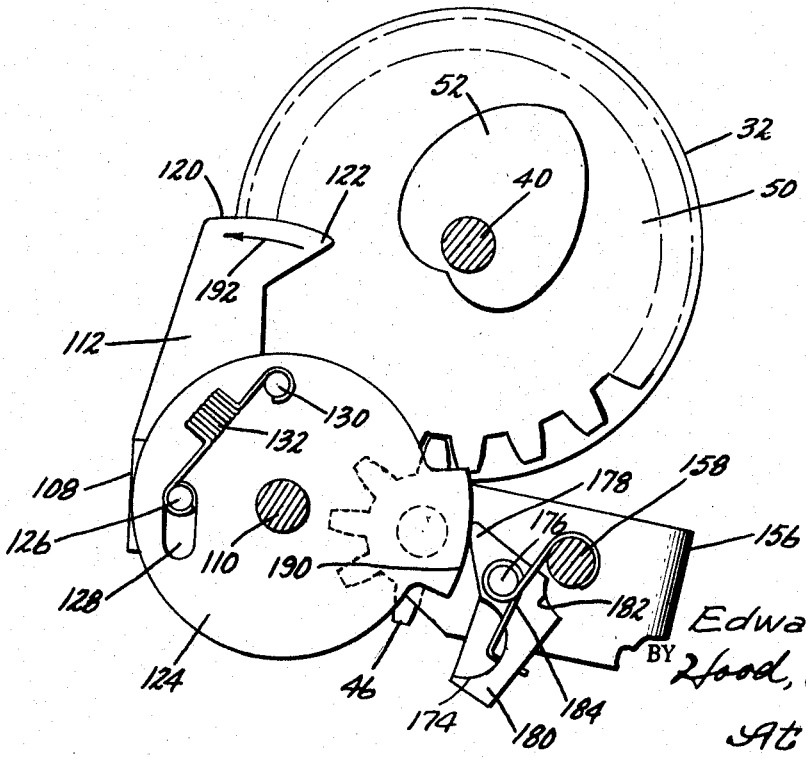

May 23, 1967  E. D. SIGL  3,321,134
GEAR TRAIN RESETTING MECHANISM
Original Filed Sept. 18, 1963  5 Sheets-Sheet 5

Inventor:
Edward D. Sigl,
by Hood, Gust & Shick
Attorneys

United States Patent Office 3,321,134
Patented May 23, 1967

3,321,134
GEAR TRAIN RESETTING MECHANISM
Edward D. Sigl, Fort Wayne, Ind., assignor to Bowmar Instrument Corporation, Fort Wayne, Ind., a corporation of Indiana
Continuation of abandoned application Ser. No. 309,719, Sept. 18, 1963. This application June 4, 1965, Ser. No. 477,057
20 Claims. (Cl. 235—144)

This invention relates generally to mechanisms for returning a gear to a predetermined rotational position independently of another gear with which it is normally in mesh, and more particularly to resetting mechanisms for revolution counters. This application is a continuation of my application Ser. No. 309,719, filed Sept. 18, 1963, and now abandoned.

Revolution counters conventionally comprise a plurality of number wheels with intermittent motion transferring mechanism respectively interconnecting the wheels and advancing each higher order number wheel a predetermined incremental amount in response to a predetermined rotation of the next lower order number wheel. A common form of intermittent motion transferring mechanism comprises a segmental gear, such as a two-tooth gear, and a cooperating locking cam rotatable with the lower order number wheel, a full-tooth gear rotatable with the higher order number wheel, and a transfer pinion having a full-tooth portion interconnecting the gears and a multilated portion having every other tooth removed cooperating with the locking cam.

There are applications where it is desirable simultaneously and substantially instantaneously to return or reset all of the number wheels of a revolution counter to a predetermined position, such as a zero indication. In order to reset the number wheels, it is necessary to disengage the transfer pinions from their respective segmental and full-tooth gears prior to resetting of the number wheels to the desired position. In conventional reset counters, the number wheels are reset by means of heart-shaped cams respectively secured to the number wheels and cooperating operating arms which engage the cams and return the same to predetermined positions. In such conventional counters, a linkage connects the operating arms and the transfer pinions so that during the first part of the resetting stroke of the operating arms the pinions are moved out of mesh with the gears, during the second part of the resetting stroke the operating arms engage the cams to rotate the number wheels to the desired position, during the first part of the return stroke, the operating arms retract from the heart-shaped cams, and during the last part of the return stroke, the pinions are moved back into mesh with the gears; the sequence of operation during a return stroke of the operating arms is the reverse of the sequence of operation during the resetting stroke.

With such conventional resetting mechanism, there is an interval during the return stroke of the operaing arms following their disengagement from the heart-shaped cams and prior to reengagement of the pinions with the gears during which the number wheels are unrestrained and can rotate due to the shock of the resetting operation, vibration, or merely due to the out-of-balance weight of the heart-shaped cams. Such unrestrained rotation of the number wheels during the resetting operation can result in an erroneous reading or in failure of the transfer pinions to go back into mesh with the respective gears. Attempts have been made to provide a restraint upon the number wheels during the last half of the resetting operation in order to prevent such rotation, however, such efforts have generally involved the application of friction on the wheels and have accordingly increased the driving torque required for normal operation.

It is therefore desirable to provide a resetting mechanism for a revolution counter in which the transfer pinions are re-engaged with the gears prior to retraction of the operating arms, i.e., while the heart-shaped cams and number wheels are restrained by the operating arms, in order to insure that the number wheels remain in proper alignment and that the pinions accurately remesh with the respective gears.

In addition to the requirement for simultaneously and substantially instantaneously resetting all of the number wheels of one counter to a predetermined position, there are instances where it is required simultaneous and substantially instantaneously to reset a number of revolution counters each having a plurality of number wheels. In prior resetting mechanisms known to the present applicant, the operating arms were in the form of pivotally mounted levers having their ends engaging and in effect pushing the heart-shaped cams to the desired position, the end of the lever engaging the low or dwell portion of the cam at its reset position. By virtue of the eccentric configuration of the heart-shaped cams, the longest lever arm and thus the greatest mechanical advantage is provided when the heart-shaped cam is rotated by 180° from its reset position, this lever arm and thus the mechanical advantage decreasing as the cam is rotated and becoming very small as the cam approaches its reset position. Thus, the force required for the resetting operation increases rapidly as the cams approach their reset positions, and substantial force is required in instances where it is necessary simultaneously to reset a bank of counters. It is therefore further desirable to provide a resetting mechanism for revolution counters wherein less torque is required adjacent the end of the resetting stroke than has hereeofore been necessary with conventional resetting mechanisms.

It is accordingly an object of the invention to provide improved mechanism for returning a gear to a predetermined rotational position independently of another gear normally in mesh therewith.

Another object of the invention is to provide an improved resetting mechanism for revolution counters.

A further object of the invention is to provide an improved resetting mechanism for revolution counters wherein proper alignment of the number wheels and accurate remeshing of the transfer pinions with the respective gears is provided.

A still further object of the invention is to provide an improved resetting mechanism for revolution counters of the type employing heart-shaped cams and operating arms for rotating the same to predetermined positions wherein the transfer pinions are re-engaged with the respective gears prior to disengagement of the operating arms from the heart-shaped cams.

Yet another object of the invention is to provide improved resetting mechanism for counters wherein less torque is required adjacent the end of the resetting stroke than has previously been necessary.

Further objects and advantages will become apparent by reference to the following description and the accompanying drawings, and the features of novelty which characterize my invention will be pointed out with particularity in the claims annexed to and forming a part of this specification.

In accordance with the broader aspects of the invention, mechanism is provided for returning a first gear of a gear train to a predetermined rotational position from another position rotationally spaced therefrom independently of a second gear which is normally in mesh with the first gear. Cam means is connected to the first gear, is rotatable therewith, and has high and dwell portions, the cam means having a normal position when the first gear is in its predetermined position. An operating member is provided movable between first and second positions, the operating member in its first position being out of engagement with the cam means and in its second position engaging the dwell portion of the cam means thus moving the cam means to its normal position in response to movement of the operating member from its first to its second position; the cam means remains in its normal position when the operating member is returned from its second position to its first position. Another member is provided for rotatably mounting the second gear and is movable between a first position with the second gear in mesh with the first gear and a second position with the second gear out of mesh with the first gear. Actuating means are provided for moving the operating member from its first to its second positions, the actuating means including means for moving the mounting member so as to move the second gear out of mesh with the first gear in advance of engagement of the operating member with the cam means. The actuating means further includes means for moving the mounting member to its first position when the operating member has reached its second position and for retaining the mounting member in its first position during return of the operating member to its first position so that the second gear is moved into mesh with the first gear prior to movement of the operating member out of engagement with the dwell portion of the cam means.

In accordance with a further aspect of the invention, the operating member has a surface which engages the dwell portion when the operating member is in its second position, the surface being convexly curved with respect to the cam means and providing a camming or wedging action therewith when the opertaing member approaches the end of its movement from its first to its second positions.

In the drawings:

FIG. 1 is a top view of an impulse counter incorporating the invention;

FIG. 2 is a view of one side of the counter of FIG. 1, partly broken away, taken along the line 2—2 thereof;

FIG. 3 is a fragmentary view of the other side of the counter of FIG. 1 taken along the line 3—3;

FIGS. 8, 9, 10 and 11 are diagrams illustrating the mode of operation of the resetting mechanism of the counter of the previous figures;

Figure 4:
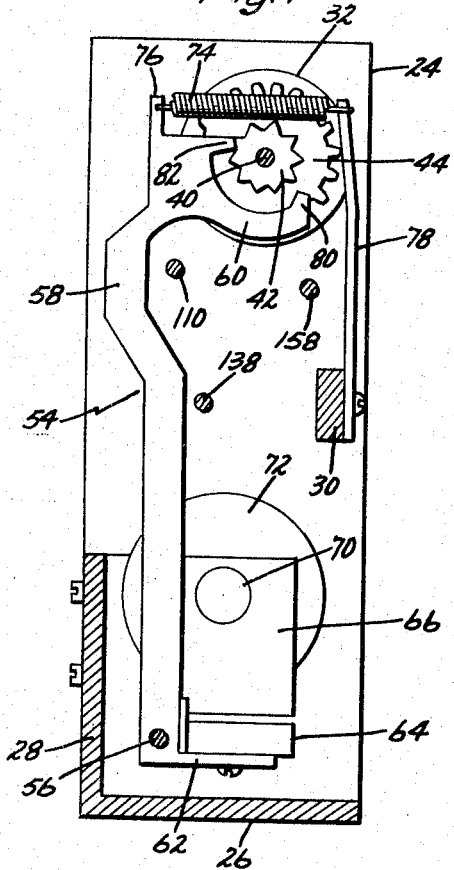
FIG. 4 is a cross-sectional view taken along the line 4—4 of FIG. 1.

Referring now to the figures of the drawing, a counter of the impulse type is shown, i.e., wherein the lowest order number wheel is advanced by one digit in response to a pulse applied to an actuating coil; in the illustrated embodiment, the lowest order number wheel is advanced by one-half digit when the actuating coil is energized and the remaining half digit when the coil is de-energized.

The counter comprises a frame 20 having upstanding ends 22 and 24 connected by a base portion 36, an actuating coil mounting portion 28, and a crossbar portion 30. In the illustrated embodiment, four progressively higher order number wheels 32, 34, 36 and 38 are provided rotatably mounted on shaft 40 extending between and journaled in the frame ends 22, 24.

A star wheel 42 is mounted on shaft 40 and has a gear 44 connected thereto. Gear 44 normally meshes with a full-tooth pinion 46 rotatably mounted on pinion shaft 48, pinion 46 normally meshing with gear 50 secured to the lowest order number wheel 32. Gears 44, 50 and pinion 46 provide a one-to-one driving connection between the star wheel 42 and the lowest order number wheel 32 and in the illustrated embodiment, gears 44 and 50 are provided with twenty teeth and pinion 46 is provided with eight teeth. Heart-shaped cam 52 is positioned between gears 44 and 50 and secured to gear 50.

An actuating pawl 54 is provided cooperating with the start wheel 42 to advance the lowest order number wheel 32. Pawl 54 is pivotally mounted on pivot post 56 extending between the frame ends 22, 24 and has an upstanding portion 58 terminating in yoke portion 60. Transversely extending portion 62 of the actuating pawl 54 has a magnetic clapper 64 secured thereto which cooperates with magnetic end members 66, 68 which are respectively secured to frame portion 28 and which support the core 70 for actuating coil 72. Actuating pawl 54 is biased into the position shown in FIG. 4 by a suitable spring 74 having one end engaging end 76 of actuating pawl 54 and its other end engaging spring hanger 78 which is secured to crossbar 30. It will be seen that when the coil 72 is energized, clapper 64 will be magnetically attracted toward members 66, 68, thus causing the upstanding portion 58 to pivot against the force exerted by spring 74 and causing end 80 of the yoke portion 60 to engage star wheel 42 to rotate the same and the lowest order number wheel 32 through gears 44 and 50 and pinion 46 by one-half digit. When coil 72 is deenergized, spring 74 returns the actuating pawl 54 to the position shown in FIG. 4 thus causing end 82 of the yoke portion 60 to engage the star wheel 42 to advance the same and the lowest order number wheel 32 an additional half digit. It will now be seen that one complete energizing pulse applied to the actuating coil 72 will result in actuation of the star wheel 42 by the actuating pawl 54 to advance the same and the lowest order number wheel 32 by one full digit.

Number wheels 32 and 34 are connected by conventional intermittent motion transfer mechanism comprising a conventional two tooth gear and locking cam 84 secured to number wheel 32, a conventional transfer pinion 86 rotatably mounted on pinion shaft 48 and a full tooth gear 88 secured to number wheel 34 and having heart-shaped cam 90 secured thereto. Likewise, number wheel 34 is connected to number wheel 36 by two-tooth gear and locking cam 92, transfer pinion 94 rotatably mounted on pinion shaft 48, and full-tooth gear 96, and number wheel 36 is connected to number wheel 38 by two-tooth gear and locking cam 98, transfer pinion 100 rotatably mounted on pinion shaft 48, and full-tooth gear 102. In the illustrated embodiment, the full-tooth gears 88, 96 and 102 are provided with twenty teeth and the transfer pinions 86, 94 and 100 are provided with eight teeth meshing with the respective full-tooth gears and with every other tooth being removed in the portion coopertaing with the respective two-tooth gear and locking cam. Heart-shaped cams 104 and 106 are respectively secured to the gears 96 and 102 on the number wheels 36 and 38.

It will be readily understood that with the counter construction illustrated, advance of each lower order number wheel through one complete revolution will result in incremental advance of the next higher order number wheel by 36°, i.e., one digit. It will be further understood that the counter apparatus thus far described is conventional and that other equivalent types of actuating and transferring mechanisms can be employed.

In order to provide for resetting the counter apparatus above-described, the mechanism now to be described is provided. An operating member 108 is provided pivotally mounted on shaft 110 extending between frame ends 22, 24, and having four resetting arms or shoes 112, 114, 116 and 118 extending upwardly therefrom and respectively cooperating with the heart-shaped cams 52, 90, 104, and 106 as will be hereinafter described. Each of the reset shoes 112, 114, 116, 118 has a curved surface 120 formed at its outer end which terminates in an actuating corner 122, the surfaces 120 being outwardly curved or convex with respect to the heart-shaped cams; the curvature of the surfaces 120 of the illustrated embodiment will be more fully described hereinafter.

An actuating member 124 is provided mounted on shaft 110 and connected to the operating member 108; in the illustrated embodiment the connection of the actuating member 124 to the operating member 108 is provided by a lost motion connection comprising a pin 126 on the operating member 108 which extends through a slot 128 in the actuating member 124 and which is connected to another pin 130 on the actuating member 124 by a suitable spring 132. A segmental gear 134 is secured to the actuating member 124 and meshes with another gear 136 mounted on shaft 138 which extends between the frame ends 22, 24. An actuating lever 140 is secured to gear 136 in any suitable manner as by a pin 142 and may have an actuating link 144 connected thereto.

Figure 5:
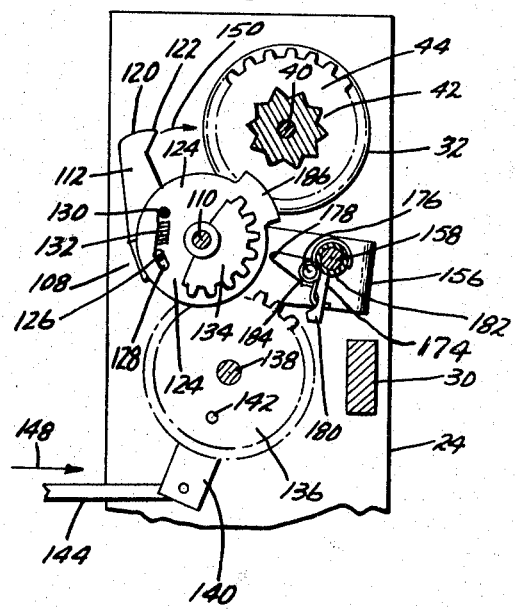
FIG. 5 is a fragmentary cross-sectional view taken along the line 5—5 of FIG. 3.
Figure 6:
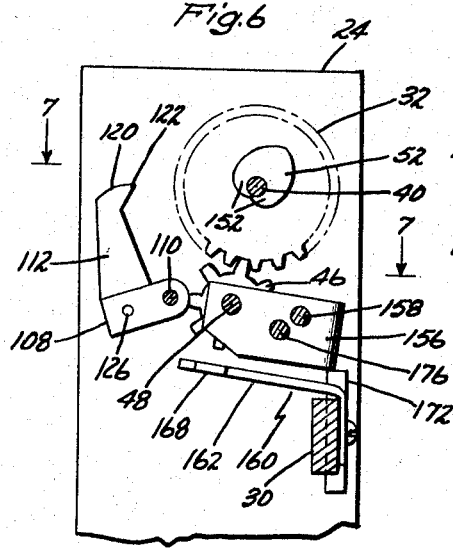
FIG. 6 is a fragmentary cross-sectional view taken along the line 6—6 of FIG. 3.
Figure 7:
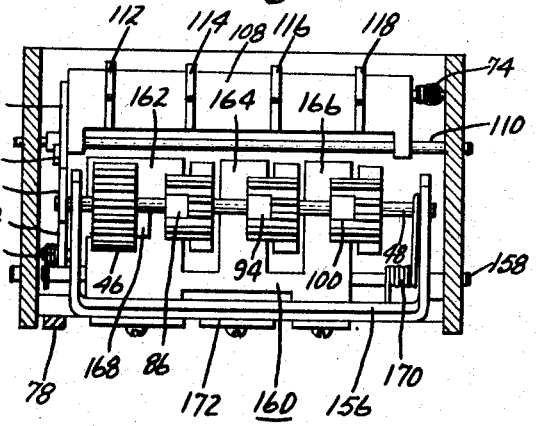
FIG. 7 is a cross-sectional view taken along the line 7—7 of FIG. 6.

Operating member 108 resetting shoes 112, 114, 116, and 118, actuating member 124, and gears 134, 136 are biased to a first or normal position by means of a suitable spring 146 having one end connected to the operating member 108 and its other end connected to frame end 24, as best seen in FIG. 2. It will now be seen that actuation of actuating link 144 in the direction shown by the arrow 148 in FIG. 5 will cause gears 136 and 134 to rotate actuating member 124, operating member 108 and the resetting shoes 112, 114, 116, 118 in the direction shown by the arrow 150 in FIG. 5. Rotation of the resetting shoes results in engagement of the corners 122 with any of the heart-shaped cams which are rotated away from their normal positions, thus causing rotation of the heart-shaped cams to their normal positions in which the curved surfaces 120 of the resetting shoes are in engagement with the lobes 152 of the heart-shaped cams which define the dwell portion thereof, as will be hereinafter more fully described.

Pinion shaft 48 upon which pinions 46, 86, 94, and 100 are rotatably mounted is supported by a U-shaped bracket member 156 pivotally mounted by means of rod 158 extending between frame ends 22, 24. Bracket 156 is thus pivotally movable between a first position in which the pinions are in mesh with the respective gears and a second position in which the pinions are out of mesh with the gears. A resilient pinion positioning plate member 160 is provided secured to the crossbar 30 and having a plurality of resilient fingers 162, 164 and 166 extending therefrom. Resilient finger 162 is in alignment with pinion 46 and the mutilated portion of pinion 86, finger 164 is in alignment with the mutilated portion of pinion 94, and finger 166 is in alignment with the mutilated portion of pinion 100. Finger 162 has a slot 168 formed therein which accommodates one tooth of pinion 46 so that alternate teeth of pinion 46 engage finger 162 when the bracket 156 is pivoted downwardly to its second position. Recalling that alternate teeth are removed from the mutilated portions of pinions 86, 94 and 100, the fingers 162, 164 and 166 respectively engage the pinions 46, 86, 94, 100 when the bracket member 156 is pivoted to its second position preventing the pinions from rotating when out of mesh with the respective gears and properly positioning the pinions so that they will go back into mesh with the respective gears when the bracket member 156 is returned to its first position.

Bracket member 156 is biased into its first position with the pinions respectively in mesh with the gears by means of a suitable torsion spring 170 surrounding pivot rod 158 having one end engaging the pinion shaft 48 and its other end extending through and engaging a suitable opening in the crossbar 30. Adjustable member 172 is slidably mounted in a slot formed in the crossbar 30 and engages the bracket member 156 in its first position.

In order to pivot bracket member 156 from its first to its second position thereby moving the pinions out of mesh with the respective gears in response to movement of the resetting shoes 112, 114, 116, and 118 toward their second positions but in advance of engagement of the corners 122 with the heart-shaped cams 52, 90, 104 and 106, and to permit the bracket member 156 to return to its first position thereby to re-engage the pinions with the respective gears while the surfaces 120 of the reset shoes are still engaged with the lobes 152 of the heart-shaped cams, dog or lever member 174 is provided pivotally mounted on bracket member 156 by a suitable pin 176 for movement between first and second positions. Lever member 174 has a first end 178 which extends toward the actuating member 124 and a second end 180 with pivot pin 176 being intermediate the two ends. Lever member 174 has an abutment portion 182 which in the first position of lever member 174 engages pivot rod 158 of the bracket member 156. Lever member 174 is biased into its first position with abutment 182 in engagement with pivot rod 158 by means of a suitable coil spring 184 surrounding pivot pin 176 with one end thereof engaging pivot rod 158 and the other end engaging a suitable opening in end 180 of lever member 174.

Figure 8:
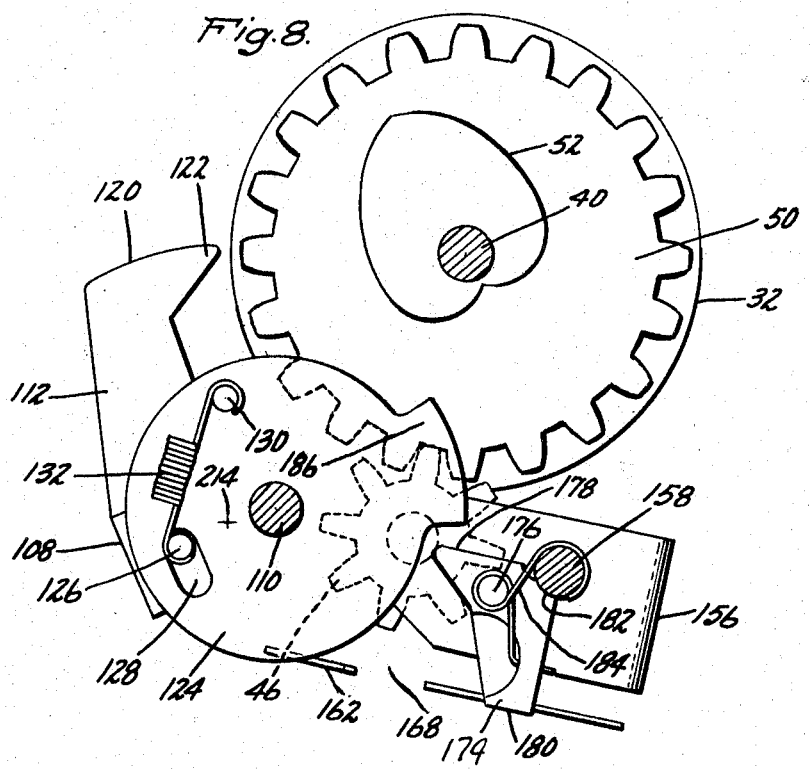
Figure 9:
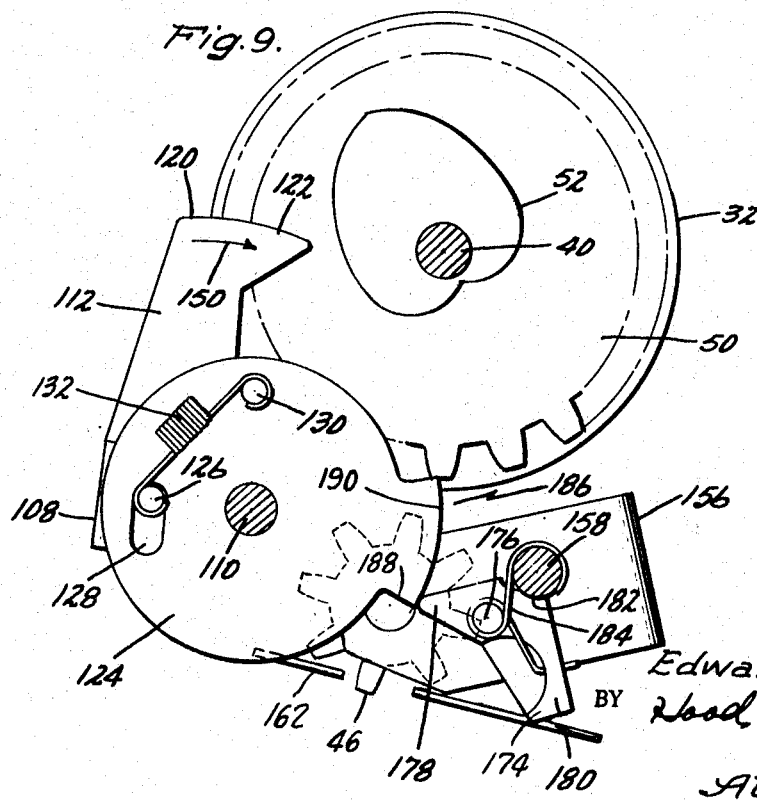

Referring now particularly to FIGS. 8 through 11, inclusive, it will be seen that actuating member 124 has a cam 186 formed thereon. It will further be seen that the lever member or dog 174 is in its first position and that the bracket member 156 is also in its first position with the pinions in mesh with the respective gears when the end 178 of the lever member 174 is out of engagement with the cam 186, as seen in FIGS. 8 and 10. It will now be seen that when the actuating member 124 is rotated by means of member 144, lever 140, and gears 134, 136 so as to rotate operating member 108 and resetting shoes 112, 114, 116 and 118 in the direction shown by the arrow 150, the leading edge 188 of cam 186 will engage end 178 of lever member 174 thus urging abutment 182 against the pivot rod 158 and causing bracket member 156 to pivot from its first position with the pinions respectively meshed with the gears to its second position with the pinions out of mesh with their respective gears; the leading edge 188 of the cam 186 is located so that bracket member 156 is pivoted to move the pinions out of mesh with the respective gears prior to initial engagement of the corner 122 of the respective resetting shoes with any of the heart-shaped cams.

End 178 of lever 174 in the second or pivoted position of bracket member 156 is in engagement with the high portion 190 of cam 186 thus retaining the bracket member 156 in its second position with the pinions out of mesh with their respective gears while the resetting shoes 112, 114, 116 and 118 engage the heart-shaped cams and move the same to their neutral positions. When the resetting shoes have reached their second positions with their curved surfaces 120 engaging the lobes 152 of the heart-shaped cams, end 178 of the lever or dog member 174 reaches the trailing edge 192 of the cam 186 thus permitting the bracket member 156 to be returned to its first position under the influence of spring 170 and bringing the pinions back into mesh with their respective gears, it being observed, however, that the resetting shoes are still engaged with the lobes 152 of the respective heart-shaped cams thus restraining the cams and the respective number wheels against rotation.

When the actuating force is removed from the member 144 so that the operating member 108, the resetting shoes 112, 114, 116, 118, the actuating member 124 and gears 134, 136 are returned to their first positions in the direction shown by the arrow 192 in FIG. 11, end 178 of lever member 174 again engages the high portion 190 of the cam 186 which pivots the lever member 174 to its second position with the bracket member 156, however, remaining in its first position with the pinions engaged with their respective gears, as best seen in FIG. 11. When the resetting shoes 112, 114, 116, 118 have been restored to their first positions as shown in FIG. 8, the end 178 of the lever member 174 has moved off of the high portion 190 of the cam 186 thus permitting the lever member 174 to be returned to its first position under the influence of spring 184.

It will now be seen that with the resetting mechanism as thus far described, the pinions are moved out of mesh with the respective gears in advance of movement of the resetting shoes into engagement with the respective heart-shaped cams, and are retained out of mesh during the interval in which the resetting shoes are rotated so as to rotate the heart-shaped cams and the number wheels to their normal positions. Further, it is seen that at the end of the initial resetting stroke, the pinions are permitted to move back into mesh with the respective gears while the resetting shoes are still engaged with the dwell portions of the heart-shaped cams thus accurately positioning the number wheels when the pinions are brought back into mesh with the respective gears. Following the re-engagement of the pinions with the respective gears, the resetting shoes are restored to their initial position with the pinions remaining in mesh with the respective gears during this return stroke.

Figure 12:
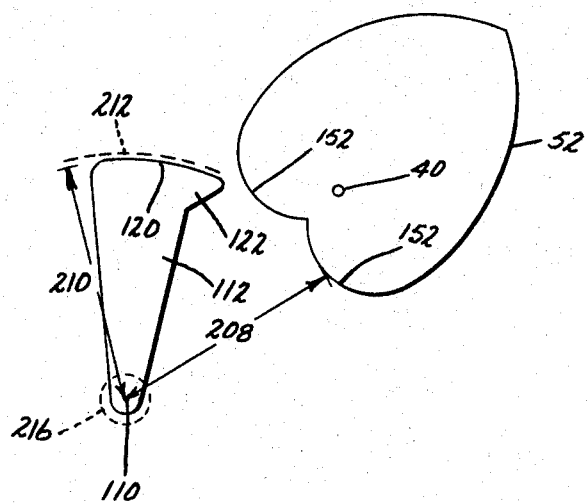
FIG. 12 is a schematic diagram useful in explaining the operation of the invention.

Referring now to FIG. 12, it will now be seen that the actuating corner 122 of the resetting shoe 112 engages the surface of the heart-shaped cam 52 when the same is rotated away from its normal position, the corner 122 rotating the heart-shaped cam toward its normal position until a point adjacent thereto at which the arcuate surface 120 will engage the adjacent lobe 152. Further rotation of the heart-shaped cam 52 toward its normal position is now accomplished by a camming or wedging action of the arcuate surface 120 with the adjacent lobe 152 until the surface 120 engages both lobes at which point the heart-shaped cam 52 is now in its normal position and firmly restrained against further rotation.

The provision of surface 120 on the resetting shoes 112 having a radius of curvature exactly equal to the spacing between the axis 110 and the surfaces of the lobes 152, respectively, as shown by the dimension line 208, is difficult due to the close tolerances which would be required and for that reason it is preferred to form the arcuate surface 120 with a radius of curvature 210 slightly greater than the spacing from the axis 110 to the lobes 152, as indicated by the dotted line 212. This in turn provides a wedging action with the lobes 152 which more firmly retains the heart-shaped cam 52 and its accompanying number wheel in the neutral position.

Referring again to FIGS. 8 through 11, the resetting shoes 112, 114, 116 and 118 thus have the radius of curvature of their arcuate surfaces 120 formed slightly greater than the spacing between the axis of shaft 110 and the lobes 152 of the heart-shaped cams when in their normal positions, the accompanying wedging action of the surfaces 120 of the resetting shoes being accommodated by the lost-motion connection between the actuating member 124 and the operating member 108 provided by the pin 126, slot 128, pin 130, and spring 132, as best seen in FIG. 10. While the center of the radius of curvature of the arcuate surfaces 120 of the resetting shoes 112, 114, 116 and 118 is desirably located coincident with the axis of shaft 110, in the illustrated embodiment for manufacturing reasons the center of the radius of curvature of the arcuate surfaces 120 was actually located at point 214 slightly offset from the axis of shaft 110, as shown in FIG. 8. Returning momentarily to FIG. 12, it will be seen that the center 214 of the radius of curvature of the arcuate surfaces 120 of the reset shoes will rotate about the axis of the shaft 110, as shown by the dotted line 216, this slight eccentricity actually enhancing the camming action of the surfaces 120 with the heart-shaped cams and accentuating the above-referred to wedging action.

Figure 13:
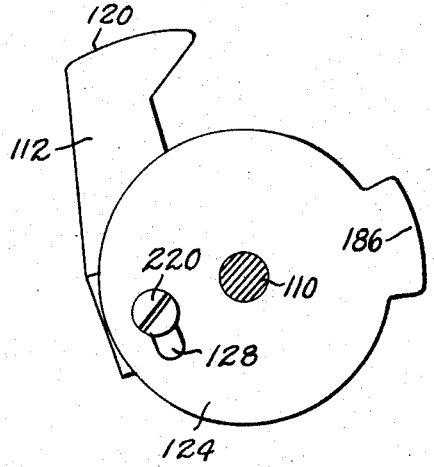
FIGS. 13 and 14 illustrate modifications of the invention.
Figure 14:
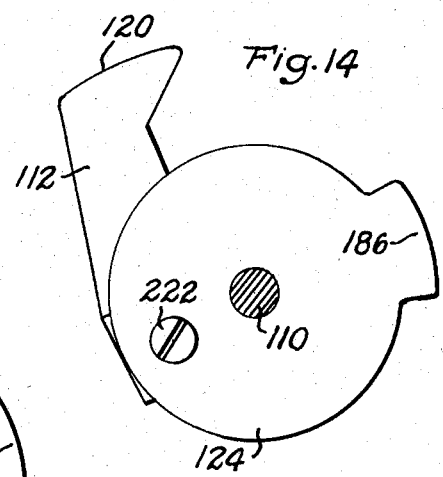

It will be readily understood that the above-described lost-motion connection between the actuating member 124 and the operating member 108 may be eliminated and an adjustable connection between the two members provided by means of an adjusting screw 220 extending through the slot 128 and received in a suitable tapped opening in the operating member 108, as shown in FIG. 13. In certain instances, the actuating member 124 and operating member 108 may be rigidly connected, as by a screw 222, as shown in FIG. 14, the wedging action of the surfaces 120 of the resetting shoes with the lobes 152 of the heart-shaped cams being accommodated by deflection of the shafts 40 and 110.

It will now be readily seen that by virtue of the camming action of the arcuate surfaces of the resetting shoes against the heart-shaped cams as they approach their normal positions, less force is required to complete restoration of the heart-shaped cams and numeral wheels to their normal positions than was previously required in prior conventional reset counters employing reset shoes which exerted a pushing force against the cams throughout their resetting motion.

While the invention has been illustrated and described as embodied in a counter of the impulse type in which there are only two discrete digital positions, i.e., numeral and half numeral, the improved resetting mechanism of the invention may equally advantageously be employed in conjunction with a continuously rotating-type counter construction of the type illustrated and described in Patent No. 3,050,250 to J. H. Mann, and assigned to the assignee of the present invention.

While I have illustrated and described a specific embodiment of my invention, further modifications and improvements will occur to those skilled in the art and I desire therefore in the appended claims to cover all modifications which do not depart from the spirit and scope of my invention.

What is claimed is:

1. In a revolution counter of the reset type including a number wheel having a gear connected thereto and rotatable therewith and a pinion normally in mesh with said gear, mechanism for returning said number wheel to a predetermined rotational position from another position rotationally spaced therefrom, said mechanism comprising: first cam means connected to said number wheel and rotatable therewith, said first cam means having high and dwell portions and having a normal position when said number wheel is in said predetermined position; an operating member movable between said first and second positions, said operating member in said first position being out of engagement with said first cam means, said operating member being adapted to engage said first cam means when the same is rotated away from said normal position thereof and to move the same to said normal position thereof responsive to movement of said operating member from said first to said second positions thereof, said operating member in said second position thereof engaging said dwell portion of said first cam means; a member rotatably mounting said pinion and movable between a first position with said pinion in mesh with said gear and a second position with said pinion out of mesh with said gear; means for normally biasing said mounting member to said first portion thereof; selectively actuable means connected to said operating member for moving the same between said first and second positions thereof; second cam means on said actuable means and cooperating cam follower means on said mounting member, said second cam means and said cam follower means being proportioned and arranged to move said mounting member from said first position toward said second position thereof responsive to movement of said operating member toward said second position thereof with said pinion moving out of mesh with said first gear in advance of engagement of said operating member with said first cam means, said second cam means and cam follower means being proportioned and arranged to permit said mounting member to move to said first position thereof under the influence of said biasing means when said operating member reaches said second position thereof, said second cam means and cam follower means being proportioned and arranged to retain said mounting member in said first position thereof during movement of said operating member from said second position to said first position thereof whereby said pinion is moved into mesh with said gear prior to movement of said operating member out of engagement with said dwell portion of said first cam means.

2. The mechanism of claim 1 wherein said first cam means is eccentrically mounted on a first axis, and wherein said operating member is mounted for rotation on a second axis spaced from and parallel with said first axis, said operating member having a surface integral therewith which engages said dwell portion when said operating member is in said second position thereof, said surface being convexly curved with respect to said first cam means.

3. The mechanism of claim 2 wherein said surface is generally arcuate with the center of its radius of curvature located adjacent a line passing through said axes.

4. The mechanism of claim 2 wherein said surface is generally arcuate with the center of its radius of curvature located adjacent said second axis.

5. The mechanism of claim 1 wherein said first cam means is eccentrically mounted on a first axis coincident with the axis of said gear and has a symmetrical heart-shaped surface having a point defining said high portion and two lobes mutually defining said dwell portion, and wherein said operating member comprises a lever pivotally mounted on a second axis spaced from and parallel with said first axis, said operating member having a generally arcuate surface integrally formed on end end thereof which terminates in a corner, said corner initially engaging the surface of said first cam means when the same is rotated away from said normal position thereof, said arcuate surface engaging said lobes when said operating member is in said second condition, said arcuate surface having the center of its radius of curvature located adjacent said second axis.

6. The mechanism of claim 5 wherein said radius of curvature of said arcuate surface is slightly greater than the spacing between said second axis and said lobes, respectively, when said first cam means is in said normal position whereby said arcuate surface is wedged against said lobes when said operating member is in said second position.

7. The mechanism of claim 1 wherein said first cam means is eccentrically mounted on said first axis, and wherein said operating member is mounted for rotation on a second axis spaced from and parallel with said first axis, said operating member having an arcuate surface with the center of its radius of curvature located adjacent said second axis.

8. The mechanism of claim 1 wherein said first cam means is eccentrically mounted on a first axis coincident with the axis of said gear and has a symmetrical heart-shaped surface having a point defining said high portion and two lobes mutually defining said dwell portion, and wherein said operating member is mounted for rotation on a second axis spaced from and parallel with said first axis, said operating member having an arcuate surface with the center of its radius of curvature located adjacent said second axis, said arcuate surface of said operating member terminating in a corner, said corner initially engaging the surface of said first cam means when the same is rotated away from the normal position thereof, said arcuate surface engaging said lobes when said operating member is in said second position thereof.

9. The mechanism of claim 8 wherein the largest diametral distance between said second axis and said arcuate surface is slightly greater than the spacing between said second axis and said lobes, respectively, when said first cam means is in said normal position whereby said arcuate surface is wedged against said lobes when said operating member is in said second position.

10. In a revolution counter of the reset type comprising coaxial lower and higher order number wheels, and transfer means for rotating the higher order number wheel a predetermined incremental amount in response to a predetermined rotation of the lower order number wheel, said transfer means including a segmental gear coaxially secured to the lower order number wheel, a full-tooth gear coaxially secured to the higher order number wheel, and a transfer pinion normally meshing with said gears, mechanism for resetting said number wheels to predetermined rotational positions comprising: first and second cam means respectively connected to said lower and higher order number wheels and rotatable therewith, each of said cam means having high and dwell portions and having a normal position when the respective number wheel is in said predetermined position; operating means movable between first and second postions, said operating means in said first position being out of engagement with both of said cam means, said operating means being adapted respectively to engage both of said cam means when the same are rotated away from said normal positions thereof and to move the same to said normal positions thereof responsive to movement of said operating means from said first to said second positions thereof, said operating means in said second position thereof respectively engaging said dwell portion of both of said cam means; means rotatably mounting said pinion and movable between a first position with said pinion in mesh with said gears and a second position with said pinion out of mesh therewith; means for normally biasing said mounting means to said first portion thereof; selectively actuable means connected to said operating means for moving the same between said first and second positions thereof; third cam means on said actuable means and co-operating cam follower means on said mounting means, said third cam means and cam follower means being proportioned and arranged to move said mounting means to said second position thereof in response to movement of said operating means toward said second position thereof with said pinion moving out of mesh with said gears in advance of engagement of said operating means with said first and second cam means, respectively, said third cam means and cam follower means being proportioned and arranged to permit said mounting means to move to said first position thereof under the influence of said biasing means when said operating means reaches said second position and to retain said mounting means in said first position thereof when said operating means is moved from said second to said first position thereof whereby said pinion is moved into mesh with said gears prior to movement of said operating means out of engagement with said dwell portions of both of said cam means.

11. The mechanism of claim 10 further comprising second means for normally biasing said operating means to said first position thereof; and wherein said third cam means has a high portion with opposite ends thereof joined to a dwell portion; said cam follower means comprising a lever pivotally mounted on said mounting means for movement between said first and second positions, abutment means engaged by said lever in said first position thereof, and means normally biasing said lever to said first position thereof; said lever cooperating with said third cam means and being in said first position thereof when not engaged with said high portion thereof; said high portion of said third cam means engaging said lever and urging the same against said abutment means thereby moving said mounting means to said second position thereof when said selectively actuable means is moved to move said operating means toward said second position thereof, said lever moving off of said high portion of said third cam means when said selectively actuable means is moved to move said operating means to said second position thereof thereby permitting said first-named biasing means to move said mounting means to said first position thereof, said high portion of said third cam means engaging said lever and moving the same to said second position thereof when said selectively actuable means is moved to move said operating means from said second to said first position thereof.

12. The mechanism of claim 11 wherein said first and second cam means are respectively eccentrically coaxially mounted on said number wheels, each of said first and second cam means having a symmetrical heart-shaped surface having a point defining said high portion and two lobes mutually defining said dwell portion; said operating means comprising a pair of members mounted for rotation on a second axis spaced from and parallel with the axis of said number wheels, each of said members having a surface cooperating with the respective cam means surface and engaging the lobes thereof when said operating means is in said second position, said surfaces of each of said members being generally arcuate with the center of the radius of curvature thereof located adjacent a line passing through said axes; said selectively actuable means comprising a member coaxially mounted on said second axis having said third cam means formed thereon; said mounting means comprising a member pivotally mounted on a third axis respectively spaced from said second axis and the axis of said number wheels and parallel therewith.

13. In a revolution counter of the reset type comprising coaxial lower and higher order number wheels, and transfer means for rotating the higher order number wheel a predetermined incremental amount in response to a predetermined rotation of the lower order number wheel, said transfer means including a segmental gear coaxially secured to the lower order number wheel, a full-tooth gear coaxially secured to the higher order number wheel, and a transfer pinion normally meshing with said gears, mechanism for resetting said number wheels to predetermined rotational positions comprising: first and second symmetrical heart-shaped cams respectively eccentrically coaxially secured to said number wheels, each of said cams having a point defining a high portion and a pair of lobes defining a dwell portion and having a normal position when the respective number wheel is in its predetermined position; an operating member pivotally mounted on a second axis spaced from and parallel with the axis of said number wheels for movement between first and second positions; said operating member having a pair of arms respectively extending therefrom, each of said arms having a generally arcuate end which terminates in a corner, said corners engaging respective cams when the same are rotated away from said normal positions thereof as said operating member is moved from said first to said second position thereof thereby to move said cams to said normal positions, said arcuate ends engaging the lobes of the respective cams when the same are in said normal position thereof and said operating member is in said second position thereof, each of said arcuate ends having the center of its radius of curvature located adjacent said second axis; spring means normally biasing said operating member to said first position thereof; a pinion carrier rotatably mounting said pinion and pivotally mounted on a third axis spaced from said second axis and the axis of said number wheels and parallel therewith for movement between a first position with said pinion in mesh with said gears and a second position with said pinion out of mesh with said gears; spring means normally biasing said pinion carrier to said first position thereof; an actuating member rotatably mounted on said second axis and connected to said operating member for selectively moving said operating member between said first and second positions thereof, said actuating member having a third cam formed thereon and having a high portion with opposite ends thereof joined to a dwell portion; a lever member pivotally mounted intermediate its ends on said pinion carrier for movement between first and second positions; abutment means engaged by one end of said lever member in said first position thereof; a spring normally biasing said lever member to said first position thereof; the other end of said lever cooperating with said third cam and being in said first position thereof when not engaged by the high portion of said third cam; said high portion of said third cam engaging said other end of said lever member and urging said one end thereof against said abutment means thereby moving said pinion carrier to said second position thereof when said actuating member is moved to move said operating member away from said first position toward said second position thereof whereby said pinion is moved out of mesh with said gears in advance of engagement of said corners with the respective first and second cams, said other end of said lever moving off of said high portion of said third cam when said actuating member is moved to move said operating member to said second position thereof whereby said pinion carrier is moved to said first position thereof, said high portion of said third cam engaging said other end of said lever member and moving the same to said second position thereof when said actuating member is moved to move said operating member from said second to said first position thereof whereby said pinion carrier remains in said first position thereof.

14. The mechanism of claim 13 wherein the radius of curvature of said arcuate end of each of said arms is slightly greater than the spacing between said second axis and the lobes of said first and second cams, respectively, when in said normal positions thereof whereby said arcuate ends of said arms are respectively wedged against the lobes of said first and second cams when said operating member is in said second position thereof.

15. The mechanism of claim 14 wherein said actuating member is connected to said operating member by a lost-motion connection for accommodating said wedging of said arcuate ends of said arms against the lobes of said first and second cams.

16. In a revolution counter of the reset type comprising coaxial lower and higher order number wheels, and transfer means for rotating the higher order number wheel a predetermined incremental amount in response to a predetermined rotation of the lower order number wheel, mechanism for resetting said number wheels to predetermined rotational positions comprising: first and second cam means respectively connected to said lower and higher order number wheels and rotatable therewith, each of said cam means having high and dwell portions and having a normal position when the respective number wheel is in said predetermined position; and operating means mounted for rotation between first and second positions about a second axis spaced from the axis of said number wheels and parallel therewith, said operating means respectively having surfaces which are convexly curved with respect to said cam means and which respectively terminate in a corner, said corners respectively cooperatively engaging said high portions of said cam means when the same are rotated away from said normal positions thereof and exerting a pushing force thereon thereby to rotate the same toward said normal positions thereof in response to initial rotation of said operating means away from said first position toward said second position thereof, said curved surfaces of said operating means respectively cooperatively engaging said cam means and exerting a camming action thereon thereby further to rotate the same toward said normal positions thereof in response to further rotation of said operating means toward said second position thereof, said curved surfaces of said operating means in said second positions thereof respectively engaging said dwell portions of said cam means in said normal positions thereof.

17. The mechanism of claim 16 wherein each of said surfaces is generally arcuate with the center of its radius of curvature located adjacent a line passing through said second axis and the axis of said number wheels.

18. The mechanism of claim 16 wherein each of said surfaces is generally arcuate with the center of its radius of curvature located adjacent said second axis.

19. The mechanism of claim 16 wherein each of said surfaces is generally arcuate with the center of its radius of curvature located adjacent a line passing through said second axis and the axis of said number wheels, said radius of curvature being slightly greater than the spacing between said second axis and said dwell portions of said cam means, respectively, when said cam means are in said normal positions thereof whereby said arcuate surfaces are respectively wedged against said dwell portions when said operating means is in said second position thereof.

20. In a revolution counter of the reset type including a number wheel having a gear connected thereto and rotatable therewith and a pinion normally in mesh with said gear, mechanism for resetting said number wheel to a predetermined rotational position comprising: a heart-shaped cam connected to said number wheel and rotatable therewith, said cam having a high point and two lobes mutually defining a dwell portion and having a normal position when said number wheel is in said predetermined position; operating means including a reset shoe mounted for pivotal movement between first and second positions, said shoe being out of engagement with said cam when said shoe is in said first position thereof, said shoe being adapted to engage said cam when the same is away from said normal position thereof and to move the same to said normal position responsive to movement of said shoe from said first to said second position thereof, said shoe in said second position thereof engaging both of said lobes and restraining said cam against rotation; means rotatably mounting said pinion for pivotal movement between a first position in mesh with said gear and a second position out of mesh therewith; means normally biasing said mounting means to said first position thereof; said operating means including actuating means connected thereto for selectively moving said shoe between said first and second positions thereof; and cooperating cam means on said operating means and mounting means proportioned and arranged to move said mounting means to said second position thereof in response to movement of said shoe toward said second position thereof but in advance of engagement of said shoe with said cam whereby said pinion is moved out of engagement with said gear in advance of said engagement to permit said mounting means to return to said first position thereof under the influence of said biasing means when said shoe is in said second position whereby said pinion is returned to mesh with said gear while said cam is restrained by said shoe, and to retain said mounting means in said first position thereof with said pinion in mesh with said gear when said shoe is moved from said second to said first position thereof.

References Cited by the Examiner
UNITED STATES PATENTS
3,178,111   4/1965   Auer _____ 235—144

RICHARD B. WILKINSON, *Primary Examiner.*